US007291193B2

(12) United States Patent
Oh et al.

(10) Patent No.: US 7,291,193 B2
(45) Date of Patent: Nov. 6, 2007

(54) CYCLONE DUST COLLECTOR AND VACUUM CLEANER THEREWITH

(75) Inventors: Jang-keun Oh, Gwangju (KR); Yong seok Heo, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 411 days.

(21) Appl. No.: 11/006,455

(22) Filed: Dec. 6, 2004

(65) Prior Publication Data

US 2006/0037291 A1 Feb. 23, 2006

(30) Foreign Application Priority Data

Aug. 23, 2004 (KR) ...................... 10-2004-0066367

(51) Int. Cl.
*B01D 45/12* (2006.01)

(52) U.S. Cl. ......................... 55/413; 55/429; 55/459.1; 55/DIG. 3

(58) Field of Classification Search .................. 55/410, 55/413, 429, 459.1, DIG. 3; 15/350, 353
See application file for complete search history.

(56) References Cited

U.S. PATENT DOCUMENTS

| | | | | |
|---|---|---|---|---|
| 4,260,401 | A * | 4/1981 | Truhan et al. | 55/339 |
| 6,168,716 | B1 * | 1/2001 | Conrad et al. | 210/512.2 |
| 6,436,160 | B1 | 8/2002 | Stephens et al. | |
| 6,810,557 | B2 * | 11/2004 | Hansen et al. | 15/353 |

FOREIGN PATENT DOCUMENTS

| | | |
|---|---|---|
| CN | 1426748 | 2/2003 |
| GB | 2388561 | 11/2003 |
| GB | 2389327 | 12/2003 |
| JP | 4011030 | 6/1940 |
| JP | 4321016 | 9/1943 |
| JP | 59 186660 | 10/1984 |
| JP | 59186660 | 10/1984 |
| JP | 6185911 | 5/1986 |
| JP | 942694 | 2/1994 |

(Continued)

OTHER PUBLICATIONS

Official Action from the German Patent and Trademark Office, Mar. 2007.

(Continued)

*Primary Examiner*—Robert Hopkins
(74) *Attorney, Agent, or Firm*—Ladas & Parry LLP

(57) ABSTRACT

A cyclone dust collector and a vacuum cleaner having the same. The cyclone dust collector has a cyclone body shaped to have a relatively wider upper portion and a relatively narrower lower portion and also has a suction port and a discharge port, a grill member connected to the discharge port, a dust receptacle connected to the cyclone body, and a blocking member for partially blocking the grill member. Air drawn in through the suction port moves in an increasingly wider radial path as it travels upwardly to the discharge port, increasing the centrifugal force on suspended particles as they travel toward the discharge port. The shape of the cyclone body prevents turbulent flow from being generated. Dust is prevented by the blocking member from attaching to the grill member before being centrifuged, performance of the grill member is enhanced.

5 Claims, 4 Drawing Sheets

FOREIGN PATENT DOCUMENTS

| | | | |
|---|---|---|---|
| JP | 10512185 | | 11/1998 |
| JP | 2003 070700 | | 3/2003 |
| RU | 2132750 | C1 | 3/1998 |
| RU | 2132750 | | 7/1999 |
| RU | 2228133 | | 6/2003 |
| SU | 497051 | | 12/1975 |
| SU | 1261717 | | 11/1984 |
| SU | 1261717 | A1 | 11/1984 |
| WO | WO0187131 | | 11/2001 |

OTHER PUBLICATIONS

Chinese Office Action and English translation, Nov. 2006.
Australian Office Action, Dec. 2006.

* cited by examiner

CYCLONE DUST COLLECTOR AND VACUUM CLEANER THEREWITH

CROSS-REFERENCE TO RELATED APPLICATIONS

This application claims the benefit of Korean Patent Application No. 2004-66367, filed Aug. 23, 2004, in the Korean Intellectual Property Office, the disclosure of which is incorporated herein by reference.

FIELD OF THE INVENTION

The present invention relates to a vacuum cleaner. More particularly, the present invention relates to a cyclone dust collector and a vacuum cleaner having the same.

BACKGROUND OF THE INVENTION

Generally, a cyclone dust collector in a vacuum cleaner draws in dust-laden air, forms a whirling or cyclonic air current that separates dust from the dust-laden air by a centrifugal force generated from the whirling air current and collects the separated dust particles in a bin or trap for later disposal. In general, cyclone dust collectors do not pass dust-laden air through an air filtration element.

FIGS. 1 and 2 are respectively, a perspective view and a cross-sectional view, of a prior art conventional cyclone dust collector. As shown in the drawings, the cyclone dust collector comprises a cyclone body 10, a suction port 11 for drawing in air, a discharge port 12 for discharging dust-separated air, a grill member 13 connected to the discharge port 12, and a dust receptacle 14.

The suction port 11 guides dust-laden air drawn in from a surface being cleaned, into the cyclone body 10. As shown in FIG. 2, the suction port 11 is tangentially connected to an inner circumference of the cyclone body 10. The drawn-in air forms a whirling, i.e., cyclonic air current flowing along the inner circumference of the cyclone body 10, as shown by an arrow in FIG. 2. Dust particles that are suspended in the air are centrifuged. Since a suction force is generated by a vacuum suction means (not shown) in the grill member 13, however, the air drawn in from the suction port 11 may fail to generate the whirling air current before being discharged through the discharge port 12. In such a case, the centrifuged dust may not be collected in the dust receptacle 14 but stuck to the grill member 13 instead, thereby deteriorating suction strength and reducing the effectiveness of the cyclone dust collector.

Furthermore, turbulence in the air flow in the cyclone body 10, which can be generated in the cyclone dust collector for many reasons, also affects dust separation. Air flow direction changes and air current collisions are just two things that can weaken the cyclone, i.e., reduce its rotational speed, thereby reducing the centrifugal force exerted on suspend dust particles. More specifically, since the cyclone body 10 has a substantially cylindrical form for smooth flow of the whirling air current, the air drawn into the cyclone body 10 through the suction port 11 undergoes sudden change in its path, accordingly forming a turbulent flow by its own inertia. In addition, as it enters the cyclone dust collector, the air drawn in through the suction port 11 collides with the whirling air current formed in the cyclone dust collector, thereby causing the turbulent flow especially in a spot S shown as a hatched area in FIG. 2. In addition, because the turbulent flow scatters away the dust already centrifuged, dust collection diminishes. A cyclone dust collector that avoids the problems created by prior art grill elements would be an improvement over the prior art.

SUMMARY OF THE INVENTION

An aspect of the present invention is to solve at least the above problems and/or disadvantages and to provide at least the advantages described below. Accordingly, an aspect of the present invention is to provide a cyclone dust collector capable of preventing dust from attaching to a grill member and restraining generation of a turbulent flow in the cyclone dust collector.

In order to achieve the above-described aspects of the present invention, there is provided a cyclone dust collector comprising a cyclone body shaped to have a relatively wide upper portion and a relatively narrow lower portion. The cyclone dust collector also includes a suction port, a discharge port, a grill member connected to the discharge port a dust receptacle connected to the cyclone body, and a blocking member for partially blocking the grill member.

The cyclone body has a top surface with a flanged part formed in the direction of the air drawn-in from the suction port, and tapered from the flanged part toward a bottom surface thereof. The flanged part includes a rounded edge.

In order to achieve another aspect of the present invention, a cyclone body shaped to have a relatively wide upper portion and a relatively narrow lower portion and comprising a suction port and a discharge port; a dust receptacle connected to the cyclone body; and a blocking member for partially blocking a grill member.

The blocking member comprises a blocking part blocking dust-laden air from flowing into a grill member; and at least one window formed on the opposite side to the blocking part to expose the grill member.

The blocking part is disposed to face an inner circumference of the cyclone dust collector. The inner circumference adjacent to the suction port is sized, structured and arranged, such that air drawn in does not directly flow into the grill member.

In order to achieve yet another aspect of the present invention, there is provided a vacuum cleaner comprising a cleaner body having therein a vacuum suction means; a suction brush mounted to the cleaner body to move along a surface being cleaned; and a cyclone dust collector removably mounted to the cleaner body. Wherein the cyclone dust collector comprises a cyclone dust collector shaped to have a relatively wide upper portion and a relatively narrow lower portion and comprising a suction port and a discharge port; a grill member connected to the discharge port; and a dust receptacle connected to the cyclone body.

In order to achieve still another aspect of the present invention, there is provided a vacuum cleaner comprising a cleaner body having therein a vacuum suction means; a suction brush mounted to the cleaner body to move along a surface being cleaned; and a cyclone dust collector removably mounted to the cleaner body. Wherein the cyclone dust collector comprises a cyclone dust collector shaped to have a relatively wide upper portion and a relatively narrow lower portion and comprising a suction port and a discharge port; a grill member connected to the discharge port; a dust receptacle connected to the cyclone body, and a blocking member for partially blocking the grill member.

Accordingly, the flanged part formed on the cyclone body enables the air current at the suction port to move in a wider radial motion, and therefore, the turbulent flow can be restrained from being generated, thereby improving dust-collecting efficiency.

Further, by existence of the blocking member, the dust included in air is not stuck to the grill member before being centrifuged, and this can prevent deterioration of suction efficiency of the grill member.

BRIEF DESCRIPTION OF THE DRAWINGS

The above aspect and other features of the present invention will become more apparent by describing in detail exemplary embodiments thereof with reference to the attached drawing figures, wherein.

DETAILED DESCRIPTION OF THE PREFERRED EMBODIMENTS

Figure 1:
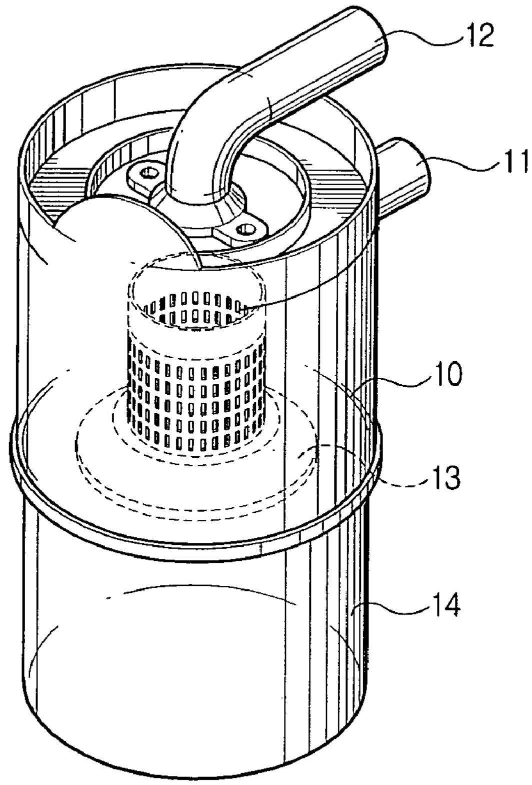
FIG. 1 (PRIOR ART)
FIG. 1 is a perspective view of a prior art conventional cyclone dust collector.
Figure 2:
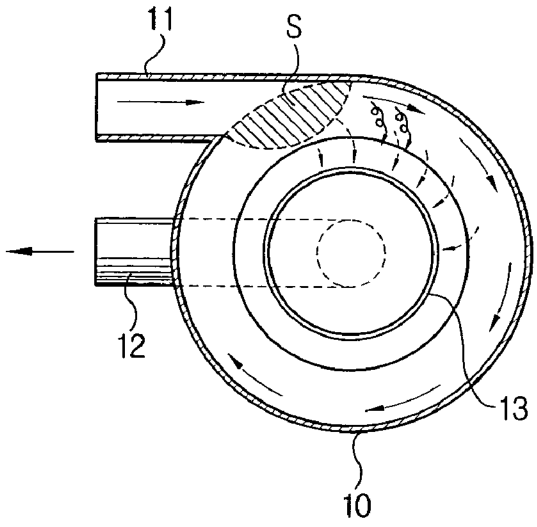
FIG. 2 (PRIOR ART)
FIG. 2 is a cross-sectional view of the prior art cyclone dust collector of FIG. 1.

Hereinafter, certain embodiments of the present invention will be described in detail with reference to the accompanying drawing figures.

In the following description, drawing reference numerals are used for the same elements in different drawings. The embodiments described herein are only examples and are not intended to limiting the invention disclosed herein. Rather, the invention disclosed herein is defined by set forth in the appurtenant claims. Also, well-known functions and structures are not described in detail, since they would tend to obscure the claimed invention in unnecessary detail.

Figure 3:
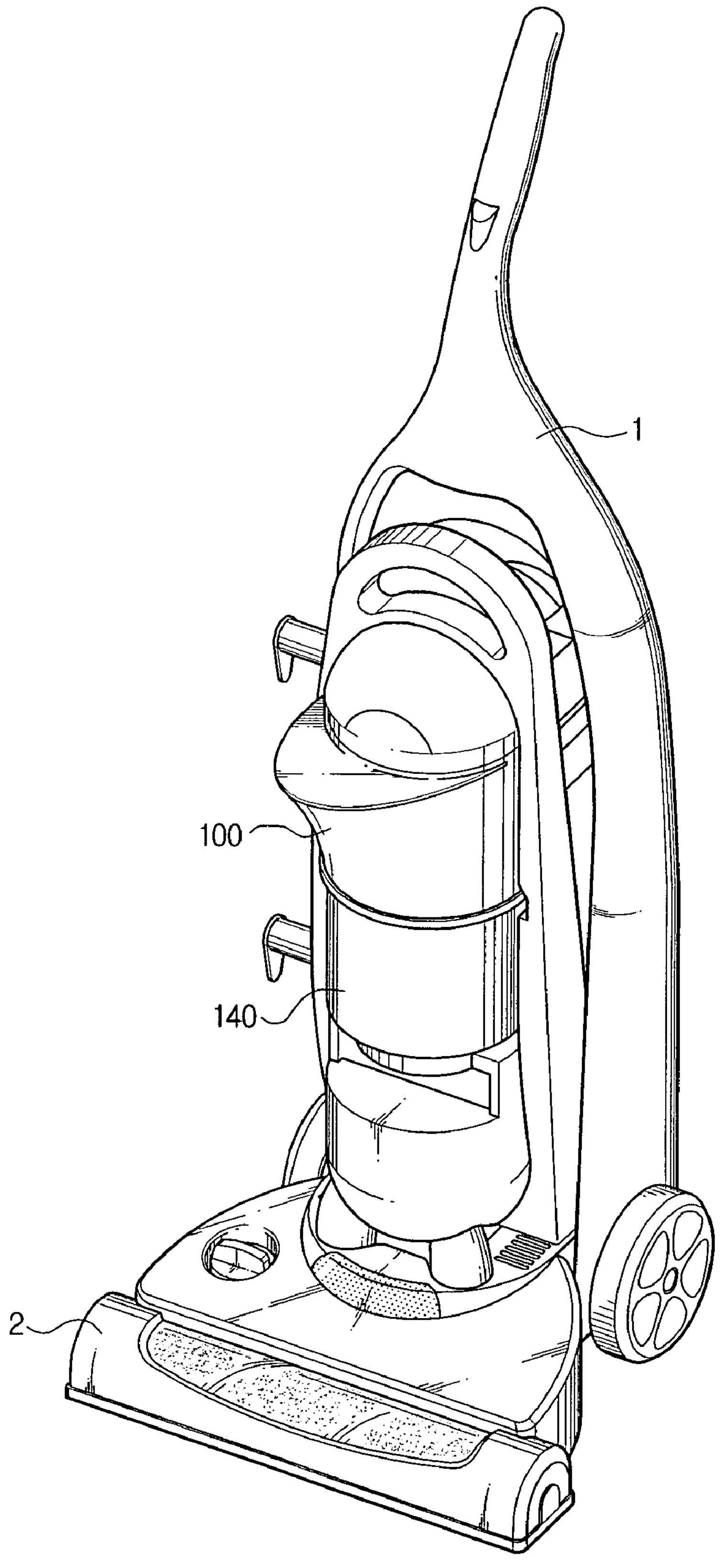
FIG. 3 is a perspective view of an upright-type vacuum cleaner having a cyclone dust collector according to an embodiment of the present invention.

FIG. 3 is a perspective view of an upright-type vacuum cleaner having a cyclone dust collector 100 according to an embodiment of the present invention. The upright-type vacuum cleaner includes a cleaner body 1 having a vacuum suction means, such as a motor-driven fan (not shown), a suction brush 2 for drawing in dust from a surface being cleaned, and the cyclone dust collector 100 for separating dust from drawn-in air. In the preferred embodiment, the cyclone dust collector 100 is detachably mounted to the cleaner body 1 so that it can be removed from the cleaner body 1, emptied, and re-installed into the cleaner body 1. Because the operation of such upright-type vacuum cleaner is well known, detailed description thereof will be omitted for brevity.

Figure 5:
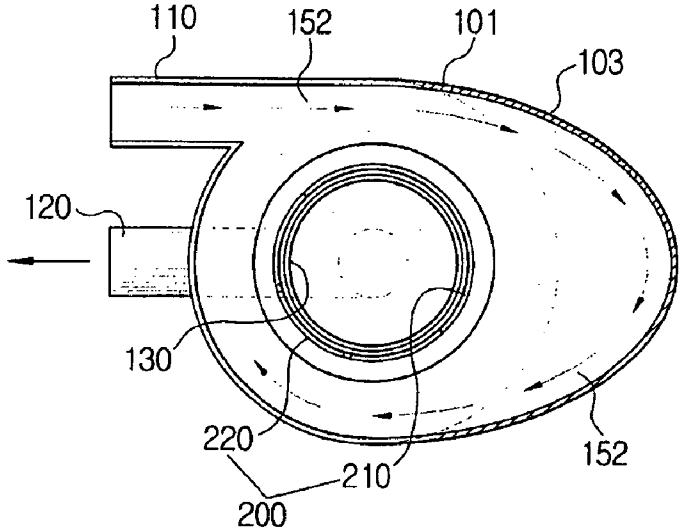
FIG. 5 is a top view of the cyclone dust collector of FIG. 4.

As shown in the exploded perspective view of the cyclone dust collector 100 shown in FIG. 5, the preferred embodiment of the cyclone dust collector 100 comprises a cyclone body 101, a grill member 130, a dust receptacle 140 and a blocking member 200. The cyclone body 101 comprises a suction port 110 for drawing in dust-laden air and a discharge port 120 for discharging clean air, from which dust from the dust-laden air has been separated and which is referred to herein as dust-separated air. The cyclone body 101 is shaped to have an upper portion that is wider than a lower portion.

A top surface 102 of the upper portion of the cyclone body 101 has a protuberance referred to herein as a flanged part 103, the shape of which resembles an inverted, truncated, right-circular cone that extends away from both the central axis 2 of the cyclone body suction port 110 and the discharge port 120 in a direction that is substantially parallel to the directions of the airflow through the suction port 110 and discharge port. Although the cross-section of the upper part of the cyclone body 101 is not shown, it can be seen from the figures that the upper part of the cyclone body 101 has a cross section that is substantially elliptical. It can also be seen that the cross section of the lower part of the cyclone body 101 is substantially circular.

As is well-known, an ellipse is defined in part by its major and minor axes wherein the length of the major axis is greater than the length of the minor axis. As can be seen in the figures, the minor axis of the elliptically-shaped upper part of the cyclone body 101 is substantially the same as the diameter of the lower part of the cyclone body 101.

Figure 4:
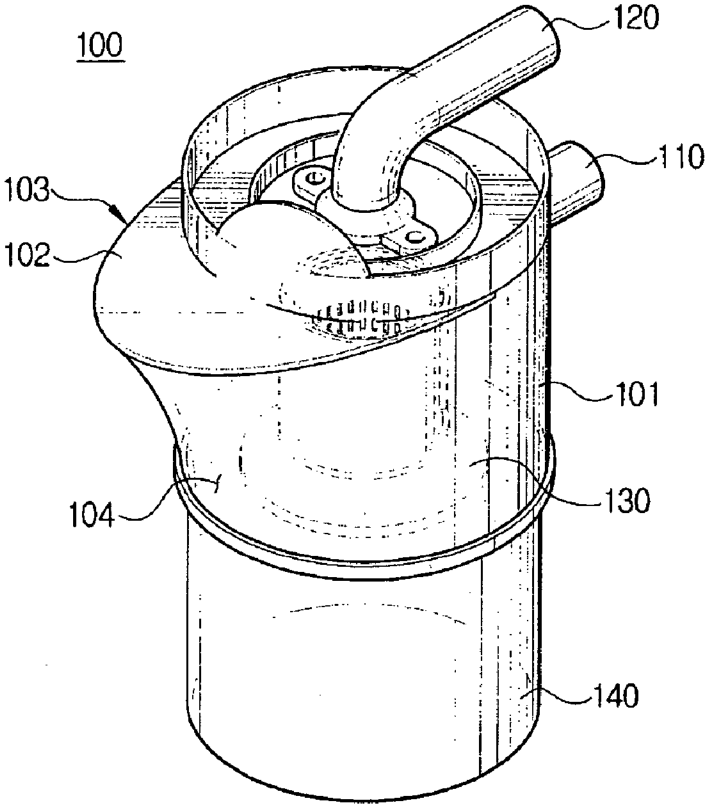
FIG. 4 is a perspective view of a cyclone dust collector according to an embodiment of the present invention.

An edge 150 of the flanged part 103 is rounded to reduce the friction losses sustained by air currents inside the cyclone body 101. A substantially circular bottom surface 104 of the cyclone body 101 provides a substantially circular opening for the dust receptacle 140 to be removably mounted thereto. The flanged part 103 is preferably tapered toward the bottom surface 104 as shown in FIGS. 4 and 6.

Figure 6:
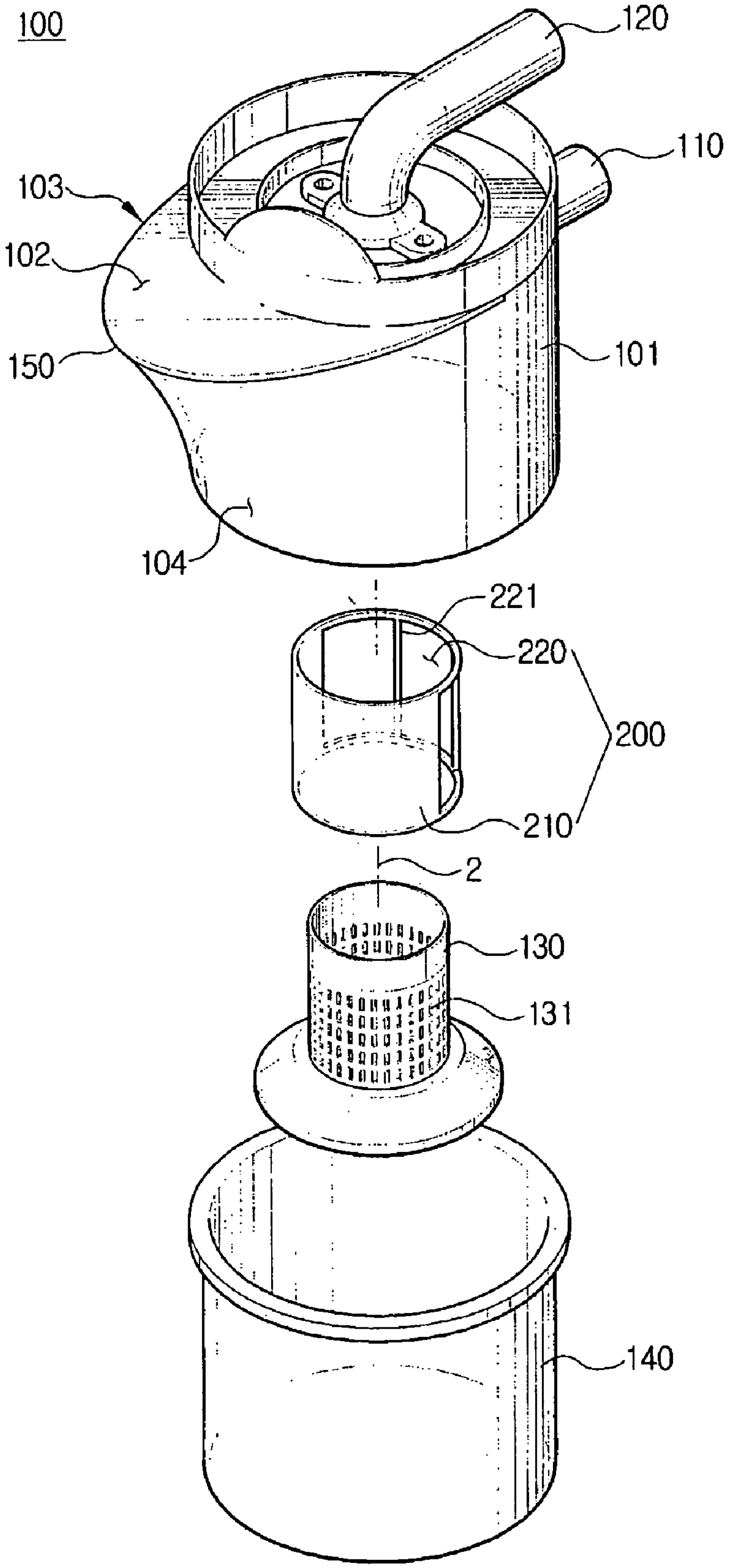
FIG. 6 is an exploded perspective view of a cyclone dust collector shown in FIG. 4.

Referring to FIG. 6, a grill member 130 has a plurality of slits or holes 131, which act to filter out particles that are suspended in the cyclone air current within the cyclone body 101. Air flows through the grill member holes 131, upwardly to the discharge port 120 and as such, the grill member 130 secondarily filters and discharges the dust-separated air to the outside of the cyclone dust collector 100. A blocking member 200 prevents dust particles from attaching themselves to the grill member 130 before being centrifugally separated. As shown in FIGS. 5 and 6, the blocking member 200 comprises a blocking part 210 and a window 220.

Referring to FIG. 6, the blocking part 210 of the blocking member 200 prevents dust in the drawn-in air suction port from flowing into the grill member 130 before being centrifuged in the cyclone body 101. To this end, the blocking part 210 is sized, shaped and arranged to block off slits 131 of the grill member 130, which is disposed under the suction port 110. By the blocking part 210 blocking the slits 131 near the suction port 110, the air drawn in through the suction port 110 is able to form the whirling air current in the cyclone body 101 without being affected by a suction force generated in the grill member 130.

If the blocking part 210 has a wide surface area, suction force may decrease, thereby deteriorating the suction efficiency. Therefore, the surface area of the blocking part 210 is properly configured in consideration of output of a vacuum motor (not shown). Preferably, the surface area of the blocking part 210 does not excess 50% of a surface of the blocking member 200.

Even though the blocking part 210 is shown in FIG. 6 to be round, the window 220 is formed on one "side" to the blocking part 210. Drawn-in air forms a whirling air current within the cyclone body 101 without being affected by the suction force that exists at the grill member 130 slits 131, which is obstructed by the solid surface of the blocking part 210. The whirling air current therefore tends to be completely formed away from the the blocking part 210 and toward the wall of the cyclone body 101 enabling a greater centrifugal force to be exerted on airborne dust particles. That is, a suction force formed at an exposed part of the grill member 130 does not adversely affect whirling air currents within the cyclone body 101.

At least one window 220 in the block member 200 is provided through which air can flow toward the grill member 130 and then to the discharge port 120. As shown in FIG. 6, a plurality of windows 220 may be formed, being sectioned by a rib member 221.

In an alternate embodiment that is not shown, the blocking member 200 can be mounted within the grill member 130.

In yet another alternate embodiment, the grill member 130 itself may be configured to function as the blocking member 200. In such an embodiment, one "side" of the grill member 130 is closed to operate as the blocking part 210 while the other side of the grill member 130 has a plurality of slits to function as the slits 131.

Hereinafter, the operation of the cyclone dust collector 100 according to an embodiment of the present invention will be described in detail with reference to the accompanying drawings.

As shown by the air flow direction arrows 152 of FIG. 5, when the air is drawn in through the suction port 110, the drawn-in air generates a whirling air current, flowing along the inner circumference of the cyclone body 101. The whirling air current centrifuges dust particles in the drawn-in air.

As can be seen in FIG. 4, FIG. 5 and FIG. 6, the suction port 110 is located below the discharge port 120 but substantially tangential to the wall of the cyclone body 101. As can also be seen in FIG. 4, FIG. 5 and FIG. 6, the circumference of the cyclone body 101 increases from the bottom of the cyclone body 101 to the top of the cyclone body 101. In other words, air that flows into the cyclone body 101 through the suction port 110 flows in tangentially to the interior wall of the cyclone body 101 and in a radial motion around the circumference of the cyclone body 101.

As the radially-flowing air moves upwardly in the cyclone body 101 toward the discharge port 120, the air flows over an increasing circumference, by which suspended air particles experience an increasing centrifugal force. Therefore, the turbulent flow, caused as the drawn-in air as it collides with the inner circumference of the cyclone body 101, is less than that compared to in the conventional cyclone dust collector where the airflow suddenly changes its route when forming the whirling air current. By preventing the turbulent flow as the above, a speed of the whirling air current can be enhanced, and therefore, the dust separating efficiency is improved. Also, scattering of the collected dust can be prevented. As a result, the cyclone dust collector 100 can more effectively separate suspended dust particles.

As shown in FIGS. 4 to 6, due to the blocking member 200 having a substantially cylindrical shape and a partial opening, provided to the grill member 130, the dust included in the drawn-in air cannot directly enter the grill member 130 but must "find" the window 220 in the blocking part 210. That is, since the blocking part 210 of the blocking member 200 is provided adjacent to the suction port 110, the suction force formed in the grill member 130 is prevented from affecting the drawn-in air.

Therefore, the air drawn in through the suction port 110 is better able to generate the whirling air current along the inner circumference of the cyclone body 101, which is not sharply curved, without being influenced by the suction force. Accordingly, only the air fully centrifuged is passed through the window 220 and discharged to the outside of the cyclone dust collector 100.

The above-configured cyclone dust collector 100 is applicable to an upright-type vacuum cleaner, as shown in FIG. 3. However, one will appreciate that adoption of such cyclone dust collector 100 is not limited to the upright-type vacuum cleaner but can also be used in a canister-type vacuum cleaner as well in all kinds of air/gas filtration systems as well. As can be appreciated from the above description, the flanged part 103 formed on the cyclone body 101 enables the drawn-in air to gently flow upwardly toward the discharge port 120. Turbulence in the cyclone body 101 is thereby prevented or reduced. Accordingly, dust separation in the cyclone body 101 is improved. In addition, the blocking member 200 prevents dust from attaching itself to the grill member 130 before being centrifuged. Therefore, performance and longevity of the grill member 130 is enhanced.

While the invention has been shown and described with reference to certain embodiments thereof, it will be understood by those skilled in the art that various changes in form and details may be made therein without departing from the spirit and scope of the invention as it is defined by the appended claims.

What is claimed is:

1. A cyclone dust collector comprising:

a cyclone body shaped to have an upper portion and a lower portion, said upper portion being wider than the lower portion, said cyclone body also having a suction port and a discharge port, a dust receptacle connected to the cyclone body near the lower portion;

a grill member within the cyclone body, said grill member being located in the cyclone body and filtering particles from air in the cyclone body before it exits the discharge port;

and a blocking member within the cyclone body for partially blocking the grill member;

wherein the blocking member is disposed to face an inner circumference of the cyclone dust collector, the inner circumference being adjacent to the suction port.

2. The cyclone dust collector of claim 1, wherein the cyclone body has a top surface including a flanged part formed in a direction of an air drawn-in from the suction port, and is tapered from the flanged part toward a bottom surface thereof.

3. The cyclone dust collector of claim 2, wherein the flanged part has a rounded edge.

4. The cyclone dust collector of claim 1, wherein the blocking member comprises: a blocking part blocking a dust-laden air from flowing into the grill member;

and at least one window formed opposite to the blocking part to expose the grill member.

5. A vacuum cleaner comprising:

a cleaner body having therein a vacuum source therein;

a suction brush mounted to the cleaner body and operatively coupled to the vacuum source; and a cyclone dust collector removably mounted to the cleaner body;

wherein the cyclone dust collector comprises:

a cyclone body shaped to have an upper portion and a lower portion, said upper portion being wider than the lower portion, said cyclone body also having a suction port and a discharge port;

a dust receptacle connected to the cyclone body near the lower portion;

a grill member within the cyclone body, said grill member being located in the cyclone body and filtering particles from air in the cyclone body before it exits the discharge port;

and a blocking member within the cyclone body for partially blocking the grill member, wherein the blocking member is disposed to face an inner circumference of the cyclone dust collector, the inner circumference being adjacent to the suction port.

* * * * *